United States Patent
Barber et al.

(10) Patent No.: US 9,195,599 B2
(45) Date of Patent: Nov. 24, 2015

(54) MULTI-LEVEL AGGREGATION TECHNIQUES FOR MEMORY HIERARCHIES

(71) Applicant: International Business Machines Corporation, Armonk, NY (US)

(72) Inventors: Ronald J. Barber, San Jose, CA (US); Naresh K. Chainani, Portland, OR (US); Vincent Kulandaisamy, Beaverton, OR (US); Sam S. Lightstone, Toronto (CA); Ippokratis Pandis, Palo Alto, CA (US); Vijayshankar Raman, Sunnyvale, CA (US); Liping Zhang, Portland, OR (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 211 days.

(21) Appl. No.: 13/926,446

(22) Filed: Jun. 25, 2013

(65) Prior Publication Data
US 2014/0379985 A1    Dec. 25, 2014

(51) Int. Cl.
*G06F 12/08*    (2006.01)
*G06F 9/50*    (2006.01)

(52) U.S. Cl.
CPC .............. *G06F 12/0811* (2013.01); *G06F 9/50* (2013.01); *G06F 9/5061* (2013.01)

(58) Field of Classification Search
CPC ... G06F 3/0611; G06F 3/0653; G06F 9/5044; G06F 12/00; G06F 3/0607; G06F 3/0631; G06F 3/0665; G06F 3/0685; G06F 17/30902; G06F 3/0608; G06F 3/064; G06F 3/067; G06F 12/0811; G06F 9/5061; G06F 9/50; G06F 9/5077
See application file for complete search history.

(56) References Cited

U.S. PATENT DOCUMENTS

| | | | |
|---|---|---|---|
| 6,657,955 B1 * | 12/2003 | Bonneau et al. | 370/229 |
| 6,915,307 B1 | 7/2005 | Mattis et al. | |
| 7,860,822 B1 | 12/2010 | Weinberger et al. | |
| 8,261,020 B2 | 9/2012 | Krishnaprasad et al. | |
| 8,285,709 B2 | 10/2012 | Candea et al. | |
| 2003/0182480 A1 * | 9/2003 | Varma et al. | 710/52 |
| 2011/0252033 A1 | 10/2011 | Narang et al. | |

(Continued)

OTHER PUBLICATIONS

Umut Orhan, "A Cache Topology Aware Multi-Query Scheduler for Multicore Architectures," Thesis, The Pennsylvania State University, Aug. 2011, 44 pages.

(Continued)

*Primary Examiner* — Hashem Farrokh
(74) *Attorney, Agent, or Firm* — Cantor Colburn LLP (57) ABSTRACT

Embodiments include method, system, and computer program product for providing aggregation hierarchy that is related memory hierarchies. In one embodiment, the method includes determining capacity of a first level memory of a memory hierarchy for processing data relating to completion of an aggregation process and generating a per thread local look-up table in said first level memory upon determining said capacity. Upon the first level memory reaching capacity, a plurality of per thread partitions to store remaining data to complete the aggregation process in a second level memory of the memory hierarchy is generated such that each of said per-thread partitions includes an identical amount of data portion on each thread. The method also includes storing the per thread partitions in said second level memory and providing a single global look up table for each of the identical data portions.

20 Claims, 5 Drawing Sheets

(56) References Cited

U.S. PATENT DOCUMENTS

2012/0011144 A1  1/2012  Transier et al.
2012/0084278 A1* 4/2012  Franke et al. ................ 707/719

OTHER PUBLICATIONS

Yaxuan Qi et al., "Towards High-performance Flow-level Packet Processing on Multi-core Network Processors," ANCS'07, Dec. 3-4, 2007, Orlando, Florida, ACM, pp. 17-26, 2007.

Lin Qiao et al., "Main-Memory Scan Sharing for Multi-Core CPUs," PVLDB '08, Aug. 23-28, 2008, Auckland, New Zealand, ACM, pp. 610-621, 2008.

Yang Ye et al., "Scalable Aggregation on Multicore Processors," Proc. of the Seventh Int'l. Workshop on Data Management on New Hardware (DaMoN 2011), Jun. 13, 2011, Athens, Greece, ACM, pp. 1-10, 2011.

Marcin Zukowski et al., "Architecture-Conscious Hashing," Proc. of the Second Int'l. Workshop on Data Management on New Hardware (DaMoN 2006), Jun. 25, 2006, Chicago, Illinois, ACM, 8 pages, 2006.

* cited by examiner

MULTI-LEVEL AGGREGATION TECHNIQUES FOR MEMORY HIERARCHIES

BACKGROUND

The present disclosure generally relates to aggregation techniques and more particularly to multi-level aggregation techniques that use memory hierarchies.

In computer architecture, memory refers to the physical devices that are used to store data generated or processed by programs or other sequences of instructions. Storage of data, and even storage of programs and instructions themselves, can be made on a temporary or permanent basis for immediate or future processing use.

The length of time required for data storage as well as expected performance level are key in electing appropriate memory devices. This is due to the fact that memory devices can be expensive and their capacity can be limited. The term permanent or primary memory is often used in association with addressable semiconductor memory such as random access devices such as (RAM) or static random access memory (SRAM) or dynamic random access memory (DRAM). Primary memory is used often for fast but temporary storage. However, other type of memory such as hard disk drives, solid-state drives (SSD), and optical disc drives provide additional and auxiliary memory storage capabilities.

Auxiliary memory storage devices can provide a less expensive solution than primary memory devices but less cost also comes traditionally with lower performance and speed. Nonetheless, slower memory devices often provide larger memory capacity. In contrast, more expensive memory devices offer less memory capacity but provide improved speed and performance. For example, a cache memory device provides faster processing time but temporal storage solutions. In addition, storage capacity of a cache is limited and therefore cache storage is used in instances where data will be displaced shortly in the future. In addition, data in cache does not always necessarily correspond to data that is located in a more permanent memory. This is because data components are often brought into cache and taken out of it one cache line at a time.

Consequently, in design of computing environments, the design architects have to elect between the many tradeoffs of providing a high performance device as opposed to cheaper memory with higher capacity and slower runtime.

BRIEF SUMMARY

Embodiments include method, system, and computer program product for providing aggregation hierarchy that is related memory hierarchies. In one embodiment, the method includes determining capacity of a first level memory of a memory hierarchy for processing data relating to completion of an aggregation process and generating a per thread local look-up table in said first level memory upon determining said capacity. Upon the first level memory reaching capacity, a plurality of per thread partitions to store remaining data to complete the aggregation process in a second level memory of the memory hierarchy is generated such that each of said per-thread partitions includes an identical amount of data portion on each thread. The method also includes storing the per thread partitions in said second level memory and providing a single global look up table for each of the identical amount of data pieces.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
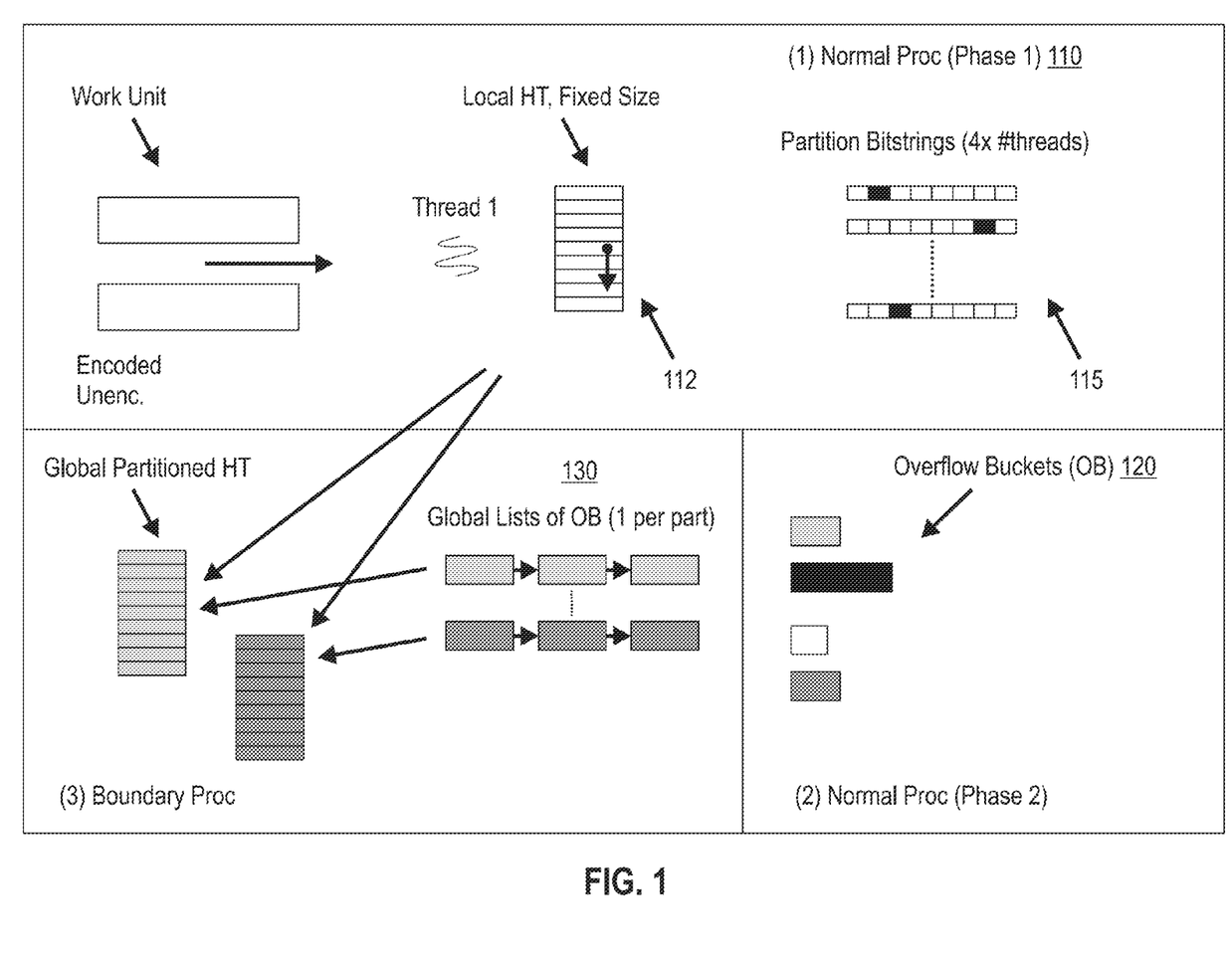
FIG. 1 is an illustration of a hierarchical aggregation process according to one embodiment.
Figure 5:
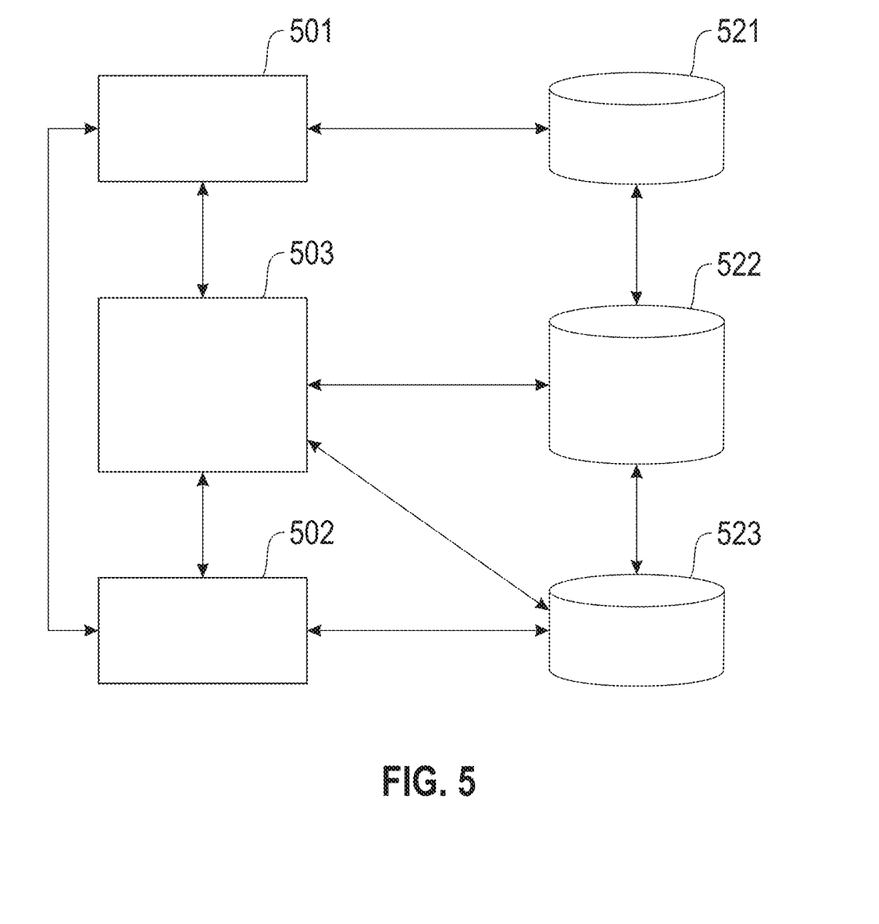
FIG. 5 depicts a block diagram illustrating a computing environment according to one embodiment.

FIG. 1 provides one embodiment of the present invention depicting a system having a data hierarchy aggregate design that is loosely tied in with a memory hierarchy. FIG. 5 provides an exemplary depiction of a system having a plurality of devices and the memory hierarchy will be discussed in detail in conjunction with FIG. 5 at a later time.

Memory device selection comes with a tradeoff between cost and performance. To take advantage of both, a memory hierarchy technique can be employed. The hierarchy is designed to divide memory storage device levels between lower and higher device levels based on need for fast access as opposed to capacity and cost. In other words, the lower levels of memory hierarchy are handled by the devices that are slower in speed and performance but offer larger storage capacity. Thus, a program will achieve greater performance if it uses memory that, for example, is cached in the upper levels of the memory hierarchy. In higher levels of memory hierarchy data storage is performed predominantly with the view that current data will be used shortly and dispatched in the near future.

Hierarchical memory, therefore, is an optimization technique that takes the benefits of spatial and temporal locality of storage devices to enhance performance in computer architecture while controlling cost. One area where memory usage is in high demand is in the area of query processing. Query processing has a number of associated activities that require memory performance and capacity. These functions and activities range greatly from parsing the queries and translating them into expressions that can be implemented to file retrieval and storage. The cost of processing of query is then often dominated by memory access. Query processing strategies effect memory optimization. Data reduction is a common operation in query processing. One way of dealing with data reduction is through aggregation.

In addition, query processing can vary greatly during critical times where there is high traffic and other times where there are only a few queries to handle. Data aggregation allows queries from millions or only a few sources to be processes using the same system. When there is high traffic, millions of query requests have to be processed simultaneously requiring different types of memory performance and capacity. By contrast, during other times where there are few queries to process cost of having extensive memory needs to be taken into account as the need for memory processing is drastically changed. Due to these extremes in memory needs and due to other challenges such as cost, performance and efficiency a technique that uses memory hierarchies is optimal. This allows the memory to expand and contract accordingly. The challenge, however, is to combine aggregation methods effectively with memory hierarchy systems. The embodiment of FIG. 1 provides a technique that uses a hierarchy of aggregators effectively by corresponding them to hierarchy memory levels to achieve an optimal result.

Data aggregation involves a data management process that gathers information usually for purposes of data analysis and statistics analysis. A common aggregation purpose is to get more information about particular groups based on specific variables and establish relationships between them that can be used in handling data more effectively. Data aggregation is important because it allows abstract entities to be grouped together by allowing relationships between them that may not always be obvious. In order to perform data aggregation, grouping and establishing relationships between these groups is important. Groupings allow many functions to be performed simultaneously and quickly including processing queries.

Data aggregation is becoming even more popular with the advent of cloud computing and the aggregation operation is sometimes referred to as "Big Data". Data aggregation is also used extensively in conjunction with database management systems (DBMS) to provide greater functionality. A Database Management System (DBMS) is a set of programs that enables storing, modifying, and extracting information from a database it also provides users with tools to add, delete, access, modify, and analyze data stored in one location. One problem with data management systems is that handling of large data sizes that utilize a great amount of memory capacity affect memory capacity. Memory hierarchy techniques are used to make the large amount of data more manageable. However, even with utilizing data hierarchy techniques, there is a tradeoff between performance and cost. In such instances, data reduction techniques are used to alleviate the problem and achieve a better balance.

Data aggregation and query processing involves generation of lists or tuples. In one embodiment such as the one provided in FIG. 1, a query processor accepts a stream of tuples or ordered lists of elements. The tuples contain grouping keys and measures which are then aggregated by performing some matching measures. In such an embodiment, aggregation is performed, on all measures that match each grouping based on a key that is obtained. One example of such an aggregation process, for example, can be grouping and gathering of lists relating to employee records such as by a city name, salary, or even by number of employees in each city. A relationship then between these groups can be established such that other data can be calculated and obtained. For example, the employee records can then be cross referenced by city name and salary, and then average salary and number of employees in each city can be computed.

Data reduction can be used effectively in conjunction with aggregation to reduce memory requirements and to also increase processing speed, especially in instances that require query processing. When MapReduce functions are available to enable query processing, data reduction and aggregation techniques use these functions to achieve better results. When a MapReduce programming model is provided, programs processing large data collections are specified as two pure functions, map and reduce. In the first phase, the map function is applied to each input item, and produces a set of key/value pairs. In the second phase, the reduce function is invoked for each distinct key with the set of map outputs for that key. MapReduce runtimes are designed to execute on clusters with a large number of nodes, and input and output files are stored in a distributed file system on the cluster. The results of the map function are stored locally, but remotely accessible files of each node, and a central coordinator realizes fault tolerance and task scheduling, re-executing work if there are node or network failures.

Performing data reduction, even when using MapReduce function, is still challenging in complex memory hierarchies. This is because it is difficult to efficiently perform data reduction on complex memory hierarchies, especially when using more sophisticated computer systems such those with Non-Uniform Memory Access (NUMA) that are often used in multiprocessing. In these computers memory access time depends on the memory location relative to a processor. Most NUMA architectures follow scaling from symmetric multiprocessing architectures and therefore, a processor can access its own local memory faster than non-local memory (memory local to another processor or memory shared between processors). An example of a NUMA aware or NUMA type system will be later discussed in conjunction with FIG. 3 and FIG. 5.

Another design challenge for NUMA and other modern computers is that these computers have many levels of memory. For example, often there is multiple levels of caches (L1/L2/L3), plurality of dynamic random access memory (DRAM) and other permanent and temporary memory such as solid-state drives (SSD). Furthermore, many multi-core computer systems increasingly have NUMA type characteristics.

In one embodiment the cache may be designated as a high level device in the memory hierarchy. There may also be a plurality of cache devices. For ease of explanation, a case is now considered where three levels of cache are used. The three cache devices can be named as L1, L2 and L3. The cache then has different levels that are used corresponding to the memory needs. For example, in one embodiment if the task is too large for L1 (the default cache with least amount of capacity), L2 may be used instead. As can be appreciated by those skilled in the art, this example was only used to aid understanding and other alternate arrangements and designations are possible.

In one embodiment, a second level of memory can be then provided by a DRAM device and other levels can be provided after that until a last level can be comprised of slower devices with highest capacity such as nonvolatile devices like hard disks.

Referring back to FIG. 1 the above concept and example can be illustrated more effectively As stated earlier, according to one embodiment a hierarchy of aggregators can be implemented which is loosely aligned to a system of memory hierarchies to solve these issues even when dealing with complex systems and large amount of data. In FIG. 1, when data is received to be processed, prior to generating tuples and aggregation data, a determination is made as whether the data, often in a look up table like a local hash table (HT) can fit the highest level of memory hierarchy. In most instances, this may be an L1 cache. If it is determined that the data will exceed the capacity tremendously, the next level such as an L2 will be determined to provide a best fit.

In the embodiment of FIG. 1, the cache levels and the DRAM are actually each made up of 'remote sockets' having 'local socket' portions, with very different access latencies and bandwidth. In other types of computer systems that have a clusters of machines, there are many more memory levels to deal with, each with different access speeds (depending on whether the memory is on a processor attached to the same motherboard, on a processor attached to the same rack). In these situations, particularly, the tradeoff is between synchronization cost and memory availability. This is discussed in more detail in conjunction with FIG. 4.

One particular design problem occurs with as the computer systems get larger. When the number of groups of aggregates is small, there is a possibility to perform an "in-cache" aggregation and then merge all the results so that ideally, everything can fit into one cache (L1 cache). Unfortunately, as the number of groups for aggregation grows larger, data will need to spill into lower levels of the hierarchy cache and memory and therefore performance is affected. An alternative with handling this situation would be to have all data threads access a single aggregation data structure (such as a hash table (HT)) but this has its own set of processing issues and is often costly as multiple copies of the memory is needed and synchronization cost is high as discussed.

In FIG. 1, the multilevel memory and multilevel aggregation hierarchy is illustrated by using a block diagram. In phase 1, depicted numerically at 110, a determination is made once the data (work unit thread 105) is received as which memory hierarchy level is most appropriate. In this embodiment, as shown a per-thread local hash table (HT) is utilized (112) that can be sized selectively such as to fit requirements for L1 cache or other memory device. Once the capacity is exceeded, the overflow is provided as shown in 120.

It should be noted that the aggregation hierarchy requires the data to be processed by corresponding memory hierarchy levels. Once the level, such as L1, is selected lists/tuples will start being generated. Tuples are aggregated, as provided in this example, in the highest level aggregator (as far as possible such as L1 or alternatively L2 when appropriate). Once the space is filled to the capacity the overflow will be provided to the next level of memory hierarchy. In one embodiment this level will be DRAM. As will be discussed, if a DRAM or other lower level memory is already being used a lower level device will be subsequently used such as a hard disk. This will be discussed in more detail later. It is also important to note that only in instances where the aggregator runs out of space, does the system migrate to lower levels of aggregators. In the aggregator at each level, a partitioning scheme is employed to reduce synchronization costs while keeping memory requirements low and to a minimum.

Prior and during the overflow process, such as to the DRAM, the overflow data is partitioned as shown at 115. The second aggregation level, in the embodiment of FIG. 1 includes partitioning the data into strings so that the partitioned HT is more for fitting in with more permanent memory such as a DRAM. In such an instance each thread partitions its input into different pieces so that some identical amount of data, referred hereinafter as "N" pieces of data for clarity, are provided. In such a case, tuples from the same group go to the same piece in all threads, using a hash function. In one embodiment, there is a single global HT for each of the N pieces.

To successfully provide for partitioning, all the measures and the grouping key should be assessed. To perform this successfully, a methodology can be implemented that first performs an initial analysis of the input to find out which of the keys are the frequent grouping keys. The tuples are then assigned selectively and preferentially from these keys to higher layers of the aggregator hierarchy. In addition, the methodology can provide for dynamically migration of groups between layers of the aggregator hierarchy when there is a change in the frequency level. In one embodiment, this can be achieved by flushing the higher level aggregators (or at least their low-frequency groups) periodically. Subsequently, these can be repopulated with new groups as they arrive, thereby capturing any distribution changes that cause groups to newly become frequent.

It should be noted that global lists is provided for the partitioned data and a global partitioning HT table is provided at 130 to hold the running aggregation over each partitioned data. In one embodiment, the partitioning includes dividing information by grouping key. In addition, to reduce synchronization cost, each thread can be provided a local buffer to hold the tuples for each partition. During partitioning, tuples are then assigned to the partition buffers with no synchronization. The local partition buffers are merged into the global partition HT only when one of two things following conditions happen: 1—the system has reached the end of the input stream and there are no more tuples to process, or 2) the memory capacity has been exhausted.

As discussed a further level of memory hierarchy may also be used in the same manner as discussed above. In the example provided and discussed in conjunction with FIG. 1 for ease of understanding three levels of memory is used but as can be appreciated by those skilled in the art, in alternate embodiments other arrangements can be provided. In this example, (a) cache was used as the first level of memory hierarchy and (b) DRAM as a second level of hierarchy. A third level of hierarchy (c) can be provided when it is determined that a second level is also reaching capacity. In this case, data is further a partitioned (HT) for fitting on hard disks and the "Global HT".

In one embodiment, however, prior to reaching capacity at least as with respect to the second (or other) memory hierarchy, an attempt is made to compact some of the data and free some space. This will be explained below in more detail. Furthermore, an attempt is first made to assign tuples to aggregators in the higher levels of the memory hierarchy. A higher level, in this context, is defined as either a faster or closer to the processor arrangement. Assignments to aggregators in lower layers are only performed when the higher layers have exhausted capacity.

In order to avoid exhausting memory capacity, in one embodiment, the aggregator at each level of the memory hierarchy can have a variety of designs. Again for ease of understanding, in this example, the aggregator can be one of two kinds but in alternate embodiments as can be appreciated by those skilled in the art, other arrangements are possible. In this embodiment, the two varieties are as follows. In the first, (i) each thread has a single local HT, thereby maintaining redundant copies of the aggregated groups. Each thread processes a subset of the input, and accumulates in its local HT the aggregates for its subset. In this scheme, when we run of space (in the current level of the memory hierarchy), subsequent tuples that contain new grouping keys have to be assigned to aggregators at lower levels.

In the second design (ii) each thread partitions its input into N local buffers. There are also N global HTs into which values from all the thread-local partitions are merged at the end. In this scheme, when the capacity is exhausted, two options can be provided. In the first option, a possibility is provided to merge all the thread-local buffers for a partition into the global HT for that partition (the partition with the largest number of local buffers can be selected so as to maximize the memory reduction). Alternatively, in a second method a local merge is performed within each thread-local buffer. This is especially appealing when the aggregation data structure is a sorted list (rather than HT) because one can maintain the local buffers in a sorted order (for example in a tournament tree, or multiple sorted segments) and thereby do fast merges. In one embodiment, an enhanced design is implemented that provide ability to acquire even more space. In this embodiment, subsequent tuples that contain new grouping keys have can be assigned to aggregators at lower levels. In some embodiments, tuples and lists are generated such that as threads are processed they merge into one another. However, a merge may not happen as the lists are being generated for a final aggregation. When capacity is being exhausted, however, as discussed the Global HT table can be consulted and a merge may occur sooner, such as by selectively choosing the longest list or entry or by some other criteria. The latter should enable freeing some memory to avoid exhausting capacity to its fullest extent.

In one embodiment, as shown in the example of FIG. 1, a technique is provided as discussed that includes determining capacity of a first level of memory hierarchy for holding data relating to a to be completed aggregation process. A per thread local look-up table is then generated in the first level of memory hierarchy upon capacity determination in order to complete the aggregation process. When the first level memory capacity is reached a per thread partitioning is generated so as to store remaining data to complete the aggregation process in a second level memory hierarchy such that said partitions are divided into identical amount of data, as referenced previously as "N" number of pieces for clarity. The per thread partitioned are stored and a single global look up table is provided for each of the partitioned N pieces until said aggregation process is completed. In an embodiment, the global look up table holds the remaining data for aggregation process completion and the look up table is a hash-table (HT). In an embodiment, memory utilization of the second level memory hierarchy is monitored to determine the memory utilization reaching a threshold. In an embodiment, upon reaching the memory capacity threshold, a threshold merge of one or more of the partitioned identical data portions into the lookup table is performed. In an embodiment, upon reaching the memory capacity threshold, a new set of per thread partitioning is generated so as to store remaining data to complete the aggregation process in a third level memory hierarchy such that the partitions are divided into an identical amount of data portion on each thread. In an embodiment, the third level memory hierarchy is monitored so that when said memory utilization for the third level memory hierarchy reaches a second threshold, the data is partitioned and stored in a fourth level memory hierarchy. In an embodiment, the first level memory hierarchy is an L1 cache memory device and the second level memory hierarchy is a dynamic random access memory device (DRAM). In an embodiment: the next level memory is monitored to determine when utilization at the next level memory has reached a threshold capacity; tuples are generated and stored in the first level of memory upon capacity determination in order to complete the aggregation process; and upon the lookup table in the first level memory reaching capacity, thread partitions including the tuples are generated so that the partitions including tuples can be stored in the second level memory hierarchy until the aggregation process is completed. In an embodiment, upon determination that L1 memory is below capacity for data, the data is stored in another first level memory hierarchy device. In an embodiment, the other first level memory hierarchy is an L2 cache memory device. In an embodiment, the memory capacity is monitored to determine the memory capacity reaching a threshold, and upon the memory capacity reaching the threshold a threshold merge is performed on a first partition. In an embodiment, the partition is selected based on its length. In an embodiment, the thread is selected by determining a longest generated tuples as part of the list stored in the global hash table. In an embodiment, it is determined if the partition merge has improved the memory capacity and another merge is performed upon determination that the capacity has not been improved sufficiently to complete the aggregation process. In an embodiment, it is determined when memory capacity cannot be further improved; and further partitioning is performed such that data can be stored in a third level memory hierarchy. In an embodiment, the third level memory hierarchy is a disk memory device.

As discussed, the multi-level aggregation process is used with memory hierarchies to generate a technique that aligns a hierarchy of aggregators with a plurality of memory hierarchy levels such that data from aggregator processes are stored in corresponding memory hierarchy levels during completion of the multi-level aggregation process. The method also includes monitoring capacity of an L1 cache providing a first memory hierarchy level to determine if said L1 cache can hold a per-thread local hash-table (HT) to be generated for completing a first stage of the multi-level aggregation process and generating and storing the per-thread local HT in said L1 cache upon capacity determination. Subsequently the L1 capacity is also monitored and upon reaching a capacity threshold, performing partitioning of said for fitting into a second level memory hierarchy DRAM such that the partitioning results in a plurality of thread partitions with each of the thread partitions having N pieces of input. The method then provides a single global HT for each of the N pieces such that each thread has a local buffer and storing a subsequent stage of multi-level aggregation by storing data including the plurality of thread partitions by storing data related to completion of the multi-level aggregation process in a dynamic random access device (DRAM) used as a second level of memory hierarchy.

In some embodiments, to provide for an optimized design, the HTs can be maintained such that they can be operated as open addressing (linear probing) HTs. Unlike in prior art, this allows an ability not to rely on a blunt fill-factor threshold to declare that the HT capacity is exhausted. In contrast, the actual number of probes is analyzed in terms of capacity for each table lookup. Only when the number exceeds a particular threshold, then the HT is declared as full. In this manner, a more robust system is provided.

It should be noted that while open addressing HTs are widely used, a common problem associated with their use in most designs is that for every hash function there exist some data sets on which they cause lots of collisions. By tying the placement in aggregator hierarchy to the length of the probes, the present embodiment achieves robustness to poor hash functions. As can be appreciated by those skilled in the art, this design applies generally to open addressing hash tables and is not restricted to the particular example as provided in the embodiment. Since, in some instances partitioning into HTs can itself be an expensive operation because it involves random data access, it is possible in one embodiment to partition not just the grouping keys but also the measures that are being aggregated.

Optimization is provided for each partition, a bitmap of all the tuples (in a batch) whose keys fall into that partition. Then for each of the measures, in this embodiment, one can use the bitmap to extract the measure values for that partition. To provide better clarity, one example can be useful. Suppose in one example that there are three partitions provided. These partitions are named as A, B and C respectively. In this example, every third tuple is routed to partition A as to form a bitmap 100100100100. In one case, two aggregates are desirably calculated: AVG(salary) and COUNT(*). For each of these aggregates input values are provided. Therefore, in this example if salary is chosen as an aggregate, the input values s1, s2, s3, s4 are provided in one example. The bitmap can then be used compact this into information into a stream of s1, s4, s7, s10. In this manner, much of the cost of partitioning is shifted into forming the bitmap itself which can then be reused.

In one embodiment, computer implemented techniques can be used that includes generating a multi-level aggregation process upon receiving data for such tasks as discussed in the example. In such a case, the multi-level aggregation process corresponding to a multi-level memory hierarchies based on generated data including: a) monitoring capacity of different memory hierarchy levels starting with first memory hierarchy level to determine a per-thread local hash-table (HT) can fit in the first level memory hierarchy when generated as part of the multi-level aggregation process; b) generating the per-thread local hash table (HT) and storing it accordingly in a first memory hierarchy level based on said determination; c) monitoring the first memory hierarchy level capacity; d) upon reaching a capacity threshold, partitioning any unprocessed remaining data into thread partitions such that each thread partitions an input into some number N pieces; e) storing said partitions into a second memory hierarchy level such that the second hierarchy level is below said first hierarchy level in said memory hierarchy; and f) providing a single global HT for monitoring status and location of each of said N pieces such that each of said thread partitions has an associated local buffer.

Figure 2:
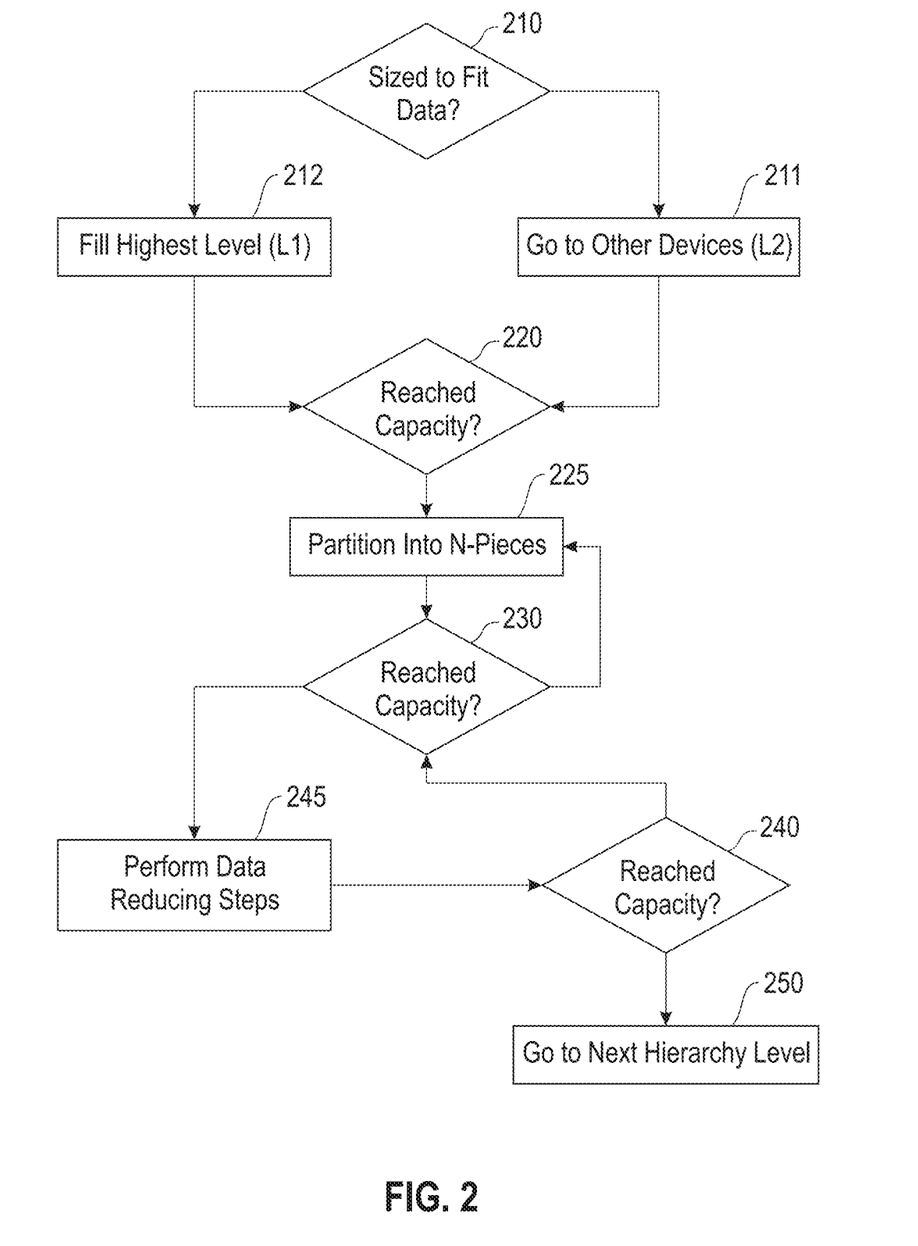
FIG. 2 depicts a process flow for providing a multi-level aggregation technique according to another embodiment.

The concepts discussed above are provided in the flow chart illustration of FIG. 2. In FIG. 2, an efficient multi-level aggregation process flow and technique for memory hierarchies, to reduce synchronization costs while keeping memory requirement low is provided. In block 210, a determination is made as whether the data fits the highest level of memory such as L1. If capacity is not adequate, L2 may be used as a next level cache. In one embodiment this is to provide a per-thread local hash-table (HT) that is sized roughly to fit in L1 cache or alternatively L2 cache. Once the capacity is reached as shown at 220/225, partitioning is employed for HT to fit in the next level of hierarchy such as in DRAM. Each thread partitions its input into some number N pieces (tuples from the same group go to the same piece in all threads, using a hash function), there is a single global HT for each of the N pieces, each thread has a local buffer to hold the tuples for each partition to reduce synchronization cost, during partitioning the tuples are assigned to the partition buffers with no synchronization, and the local partition buffers are merged into the global partition HT if have reached the end of the input stream and there are no more tuples to process or when memory capacity has exceeded. When capacity is exceeded, data reducing measures are taken as shown at 230/235 and discussed earlier. If these measures do not provide more capacity as shown at 240, then a step is performed to partition HT for fitting on next level of hierarchy such as hard disks is performed. This is shown in block 250.

Figure 3:
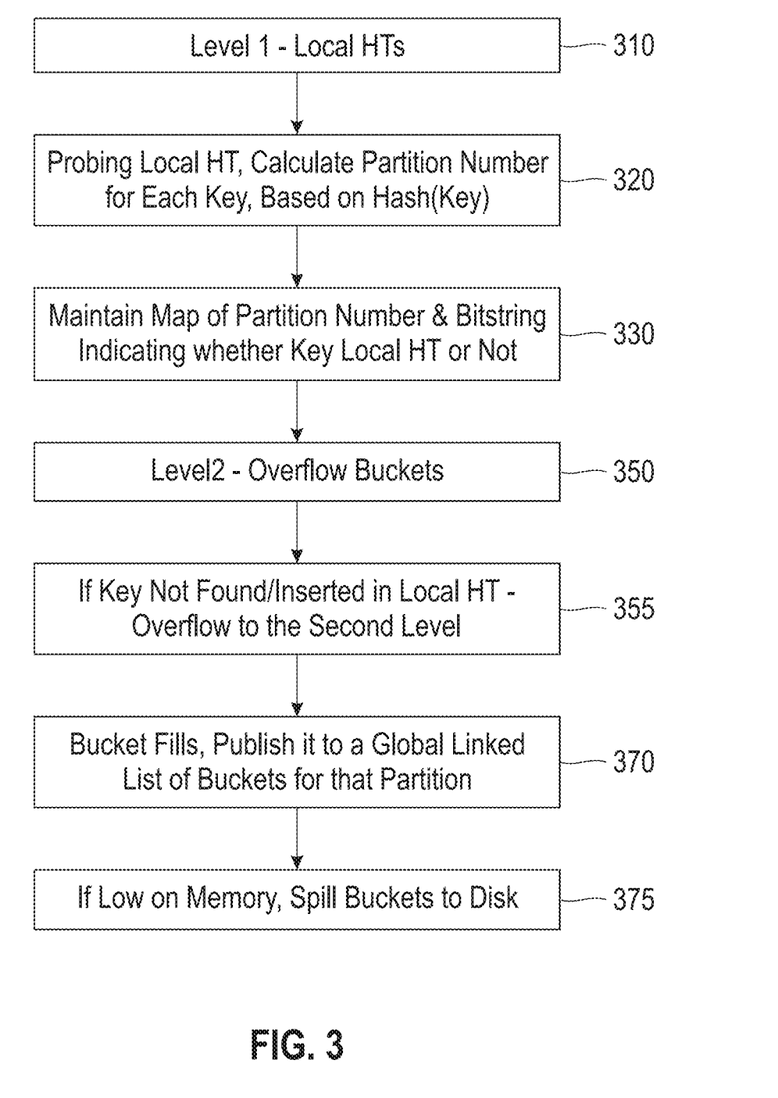
FIG. 3 depicts a process flow for an exemplary embodiment for establishing a hierarchical aggregation process according to one embodiment.

FIG. 3 provides a flow diagram of an example of one embodiment to aid understanding. In this example, a fixed number of partitions with multiple of number of threads (4×) can be used. For each work unit, for ease of reference 32K tuples can be provided. As shown at 310, when dealing with "Level 1" memory hierarchy, local HTs provide a thread-local cache-resident fixed-size HT. For example, each local HT can have 512 slots and for each Hash(key) and linear probe at most 4 slots are provided. While probing local HT, the partition number for each key, based on Hash(key) is determined and calculated as shown at 320. In block 330, a map with the partition number for each key in the work unit is maintained and a bit string indicating whether the key is in the local HT or not is provided.

In block 350, when dealing with "Level 2", overflow buckets are provided. This is when the key is not found or inserted in the local HT which signals an overflow to the second level is needed. In such a case as shown at 355, the key is appended and measures to a thread-local overflow bucket for the key's corresponding partition is also provided. The overflow bucket is allocated to the socket of the thread that it is going to consume that partition in the next phase (NUMA-awareness). One example of this is provided in FIG. 4.

In block 370, when bucket is fills, the capacity is being exhausted. This is handled by publishing the information to a global linked list of buckets for that partition. In case the memory is low, as shown at 375, the bucket is further spilled to other levels of memory such as to disks.

When all threads have consumed their input, as shown at 380, each thread deterministically picks a set of partitions to process (for example 2 partitions with encoded keys and 2 with unencoded keys). This allows a uniform load per thread when using a hashing mechanism.

For each partition, as discussed before, a global (partitioned) HT is created. Looking at the example of FIG. 4, this may be allocated to s local socket (NUMA-aware). The local HTs will merge and for every local HT, the groups that belong to that partition and merge them to the global HT are determined and accessed and used until the list of overflow buckets are all consumed. As stated before, since the threads merge into one another the merge to the global HT occurs gradually without any need for synchronization. In one embodiment, the results can be vectorized to provide nested queries.

Figure 4:
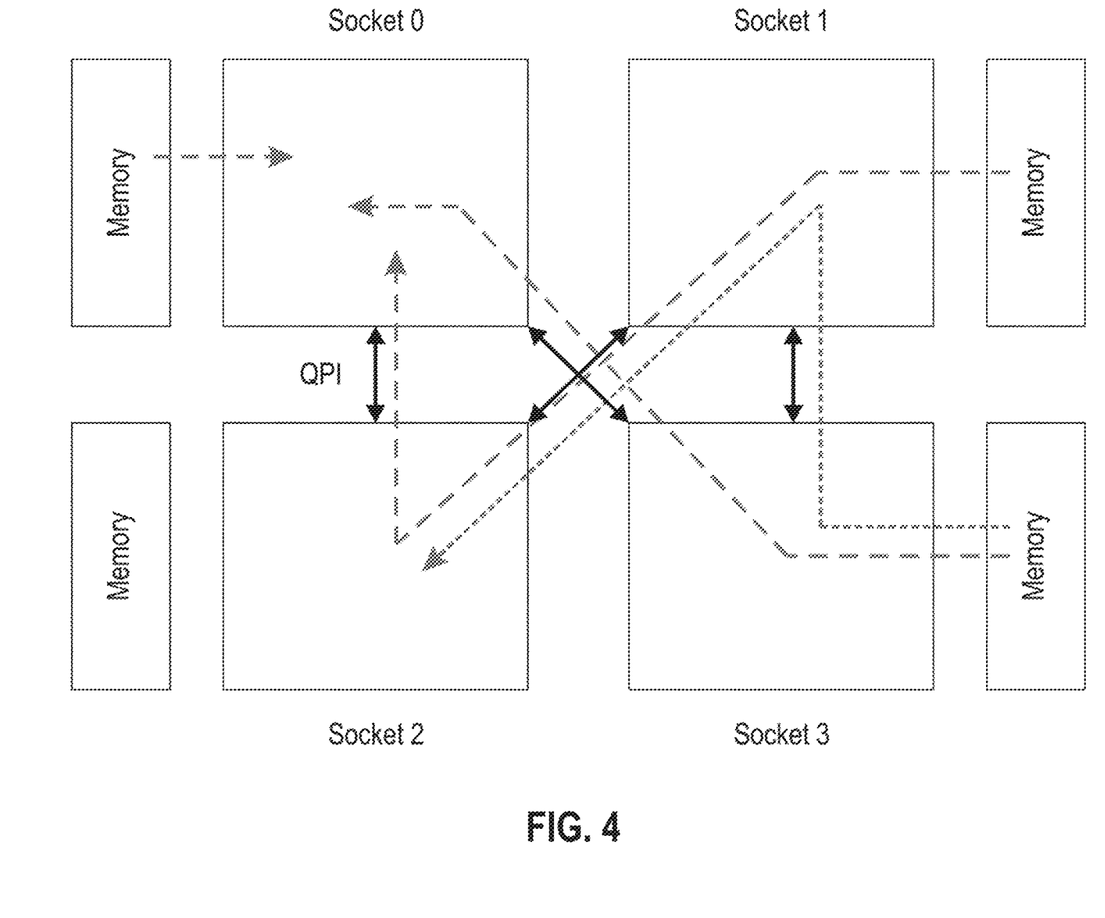
FIG. 4 depicts a NUMA aware hierarchal system according to one embodiment.

In FIG. 4, the example of a NUMA like design is provided. In this example, a plurality of memory devices and hierarchies are provided that are in processing communication through using sockets 0 through 3. This will ensure that the NUMA bandwidth is used efficiently because the single design provided can easily provide parallelism with minimal need for synchronization. This allows hundreds of millions of queries from groups and customers to be processed with limited hardware resources at the same time. The memory efficiency provided by the design as discussed earlier does need a tradeoff between cost and performance as it optimizes both by having a hierarchy of aggregators that are loosely aligned to the memory hierarchy. NUMA and NUMA-aware designs can be used easily because tuples are aggregated in the highest level aggregator possible and only when that aggregator runs out of space, migration occurs to lower levels. At each aggregator level, a partitioning is employed as discussed, to reduce synchronization costs and keep memory requirement low to achieve high performance and provide scalability. As was discussed earlier, the memory devices such as the cache levels and the DRAM are actually each made up of 'remote sockets' having 'local socket' portions, with very different access latencies and bandwidth.

The design can as discussed handle large number of queries but also be sized to handle queries with small number of groups. The latter is achieved by having thread-local aggregation on cache-resident fixed-sized HTs. When handling queries with large number of groups, partitioning groups that do not match in local HTs is used but this step can be avoided with dealing with smaller groups. Similarly, merging is partition-local and avoids expensive merging and need for synchronization in all cases.

FIG. 5 provides for an illustration of a block diagram showing a memory system according to one example. As plurality of nodes shown as 501, 502 and 503 are provided to be in processing communication with one another and with a plurality of memory devices or components 521, 522 and 523. The memory devices can be external to one or more devices or be independent units. They can be comprised of caches, DASDs and other forms of permanent memory or be comprised of a temporary memory device such as those provided by disks and tapes. The nodes can be comprised of a computer, a wireless device or be simply a processor residing in one or more electronic devices. The hierarchy in the memory can be simply designed by type of device or be controlled by one or more of the nodes that is designated like a Central Processing Unit (CPU). Hierarchy can be established also based on the type of operation that is to be conducted.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    determining capacity of a first level memory of a memory hierarchy for processing data relating to completion of an aggregation process;
    generating and storing a per thread local look-up table in said first level memory upon determining said capacity;
    upon said first level memory reaching capacity, generating a plurality of per thread partitions to store remaining data to complete said aggregation process in a second level memory of said memory hierarchy such that each of said per-thread partitions includes an identical amount of data portion on each thread;
    storing said per thread partitions in said second level memory; and
    providing a single global look up table for each of said identical data portion.

2. The method of claim 1, wherein said global look up table holds said remaining data for aggregation process completion and said look up table is a hash-table (HT).

3. The method of claim 1, further comprising monitoring memory utilization of the second level memory hierarchy to determine said memory utilization reaching a threshold.

4. The method of claim 3, further comprising upon reaching said memory capacity threshold, performing a threshold merge of one or more of the said partitioned identical data portion into said lookup table.

5. The method of claim 3, further comprising upon reaching said memory capacity threshold, generating a new set of per thread partitioning so as to store remaining data to complete said aggregation process in a third level memory hierarchy such that said partitions are divided into an identical amount of data portion on each thread.

6. The method of claim 5, wherein said third level memory hierarchy is monitored so that when said memory utilization for said third level memory hierarchy reaches a second threshold, said data is partitioned and stored in a fourth level memory hierarchy.

7. The method of claim 1, wherein said memory hierarchy includes a plurality of memory hierarchy levels and memory utilization at each memory level hierarchy is monitored to determines when said level reaches a corresponding threshold, further comprising upon reaching said threshold, storing said remaining data in a next memory hierarchy level.

8. The method of claim 7, wherein said first level memory hierarchy is an L1 cache memory device and said second level memory hierarchy is a dynamic random access memory device (DRAM).

9. The method of claim 8, further comprising:
    monitoring said next level memory to determine when utilization at said next level memory has reached a threshold capacity;
    generating and storing tuples in said first level of memory upon capacity determination in order to complete said aggregation process; and
    upon said lookup table in first level memory reaching capacity, generating thread partitions including said tuples so that said partitions including tuples can be stored in said second level memory hierarchy until said aggregation process is completed.

10. The method of claim 8, wherein upon determination that L1 memory is below capacity for data, said data is stored in another first level memory hierarchy device.

11. The method of claim 10, wherein said another first level memory hierarchy is an L2 cache memory device.

12. The method of claim 1, further comprising:
    monitoring said memory capacity to determine said memory capacity reaching a threshold; and
    upon reaching said memory capacity reaching said threshold, performing a threshold merge on a first partition.

13. The method of claim 12, wherein said partition is selected based on its length.

14. The method of claim 12, wherein said thread is being selected by determining a longest generated tuples as part of said list stored in said global hash table.

15. The method of claim 12, further comprising determining if said partition merge has improved said memory capacity and performing another merge upon determination that said capacity has not been improved sufficiently to complete said aggregation process.

16. The method of claim 12, further comprising determining when memory capacity cannot be further improved; and performing further partitioning such that data can be stored in a third level memory hierarchy.

17. The method of claim 12, wherein said third level memory hierarchy is a disk memory device.

18. The method of claim 1, wherein different aggregation hierarchy levels are established corresponding to different hierarchy memory levels.

19. A computer program product for a multi-level aggregation process used for memory hierarchies, the computer program product comprising a non-transitory computer readable storage medium having computer readable program code embodied therewith, said computer readable program code being executable by a processor to:
    determine capacity of a first level memory of a memory hierarchy for processing data relating to completion of an aggregation process;
    generate and store a per thread local look-up table in said first level memory upon determining said capacity;
    upon said first level memory reaching capacity, generate a plurality of per thread partitions to store remaining data to complete said aggregation process in a second level memory of said memory hierarchy such that each of said per-thread partitions includes an identical number amount of data portion on each thread;
    store said per thread partitions in said second level memory; and provide a single global look up table for each of said identical amount of data portion.

20. A system for processing a multi-level aggregation having hierarchical levels, comprising:
- a plurality of memory devices also having plurality of hierarchy memory levels such that each hierarchical memory level can be assigned a corresponding aggregation hierarchical level;
- said memory devices having a cache device as a first level memory hierarchy level and a dynamic random access memory (DRAM) as a second memory hierarchy level and a hard disk as a third memory hierarchy level;
- a processor for determining capacity of said cache so as to contain a per-thread local hash-table (HT) to be generated for completing said aggregation process;
- said processor generating and storing threads in said cache in order to complete said multi-level aggregation process;
- said processor monitoring said cache capacity and upon reaching a capacity threshold partitioning said HT for fitting into said second level memory hierarchy DRAM by first partitioning said HT table such that each thread partitions include an identical amount of data portion of thread;
- a global HT table for storing each of said identical amount of data portion such that each thread has a local buffer.

* * * * *